United States Patent [19]

Ban

[11] 4,063,571

[45] Dec. 20, 1977

[54] FLOW REGULATOR AND SYSTEM

[76] Inventor: Stephan C. Ban, 9009 Mears St., Fairfax, Va. 22030

[21] Appl. No.: 765,326

[22] Filed: Feb. 3, 1977

[51] Int. Cl.² ............................................. F16K 11/22
[52] U.S. Cl. ................................................ 137/599.1
[58] Field of Search ............................ 137/599, 599.1

[56] References Cited

U.S. PATENT DOCUMENTS

| 291,818 | 1/1884 | Tudor | 137/599 |
| 4,030,523 | 6/1977 | Cram et al. | 137/599 |

*Primary Examiner*—Robert G. Nilson
*Attorney, Agent, or Firm*—Nathan Edelberg

[57] ABSTRACT

A flow regulator of novel construction is placed across a pump as part of a parallel circuit and enables tapping the principal flow without loss of pumping pressure or introduction of air, subdividing the tapped flow for use in an auxilliary circuit, and/or recombining the flow from an auxilliary circuit with the principal flow. The regulator is formed by a plurality of interconnected passages containing adjustable valve members and separated in part by orifice plates.

4 Claims, 2 Drawing Figures

4,063,571

FLOW REGULATOR AND SYSTEM

GOVERNMENT RIGHTS

The invention described herein may be manufactured, used, and licensed by or for the Government for Governmental purposes without the payment to me of any royalties thereon.

BACKGROUND OF THE INVENTION

The invention relates to the field of fluid flow (either liquid or gas) and in particular to a fluid flow regulator and system which enables tapping a principal flow without loss of pumping pressure or introduction of air, subdividing the tapped flow for use in an auxilliary circuit, and/or combining the flow from an auxilliary circuit with the principal flow.

In numerous systems a fluid is pumped about a circuit from which it is desired to tap off a minute portion, e.g., for water treatment. Prior art flow regulating systems for achieving these results are well known, but are either suited for one particular application or involve a complex arrangement that is costly to produce. It is, therefore, an object of this invention to achieve a flow regulator and system that is readily adaptable to any of a variety of fluid handling applications while at the same time being simple and inexpensive to produce.

SUMMARY OF THE INVENTION

To the end of achieving a fluid flow regulator and system that is free from the above noted disadvantages, a fluidic regulator device has been designed that is formed from a simple block having a plurality of orifices and sets of parallel passages that utilizes the pressure differential existing across a fluid pump as a means for separating and recombining auxilliary fluid streams with the main flow through the pump circuit.

DESCRIPTION OF THE PREFERRED EMBODIMENT

Figure 1:
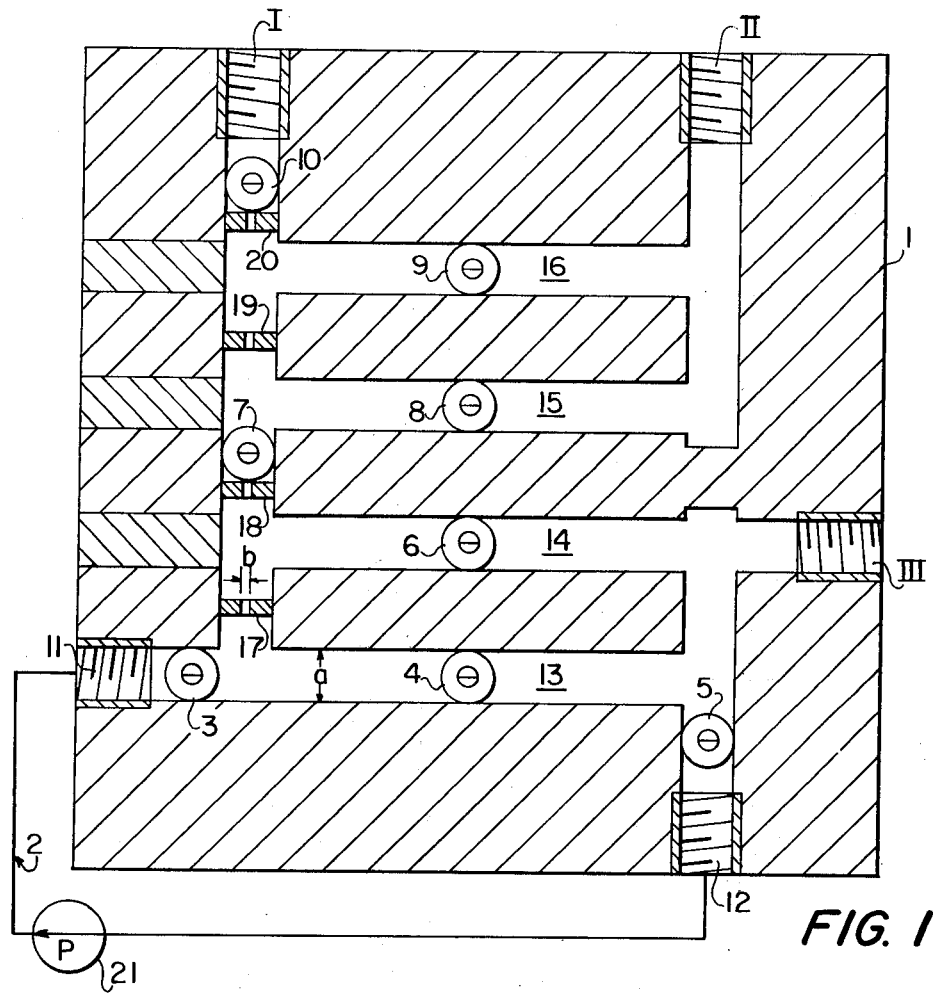
FIG. 1 is a cross-sectional view of the preferred embodiment flow regulator of the present invention with the pump connection schematically indicated.

The structure of the preferred embodiment regulator device is illustrated in FIG. 1 as a body member 1 having a plurality of ports, passages, and orifices which enable delivery of any pressure value between a pump high side pressure P and its low side pressure V.

Control over the pressure values can be had via a series of valves 3–10 which may be of any conventional design, such as ball valves. Valves 3 and 5, located within intake port 11 and exhaust port 12, respectively, are the primary control valves in that they set the pressure limits within the regulated circuit. For example, with valve 3 fully open and 5 fully closed, the maximum pressure of the pump will be experienced at auxilliary port III, while maximum suction will be obtained with the valve positions reversed, and any variety of pressures in-between these levels by varying the relative aperture openings between full open and full closed. It should be noted, however, that, with the specific configuration shown, valve 4 should be partially closed to prevent sucking fluid through orifice 17 into passage 13 due to the creation of a venturi effect when valve 5 is open at least as much as valve 3.

The auxilliary port III (as can be seen from FIG. 1) communicates directly with the end of a first set of interconnected parallel passages 13, 14, that is closest to exhaust port 12. The opposite ends of the passages 13, 14, are interconnected via an orifice plate 17. In line with orifice plate 17 is a second orifice plate 18 which is in a passage interconnecting the first set of passages 13, 14, with a second set of parallel passages 15, 16. Like the passages of the first set, the passages of the second set are interconnected at the end closest to the intake port 11 via an orifice plate 19. An auxilliary port I, which contains a flow rate controlling valve 10 and orifice plate 20, communicates directly with the second set of passages 15, 16, as does auxilliary port II.

While, as previously noted, valves 3 and 5 set the pressure limits of the regulated system, valves 4 and 6–10 control the pressures or pressure differentials within various portions of the regulated system. For example, with valves 3, 5, 7, and 8 fully open, and valves 4, 6, and 10 fully closed, a maximum pressure differential will exist between ports II and III. Opening valve 4 will reduce the pressure differential existing between these ports, and valve 6 serves as a fine adjustment. It has been found that, if passages 13 and 14 are of equal diameter and passage diameter $a$ is related in size to orifice diameter $b$ such that $10b^2 = a^2$, then valve 6 will affect the flow to one-tenth the degree of valve 4. Similarly, flow can be proportioned between ports I and II by opening valve 10, varying the amount valve 8 is opened, and using valve 9 as a fine adjustment in the same manner as valve 6.

Figure 2:
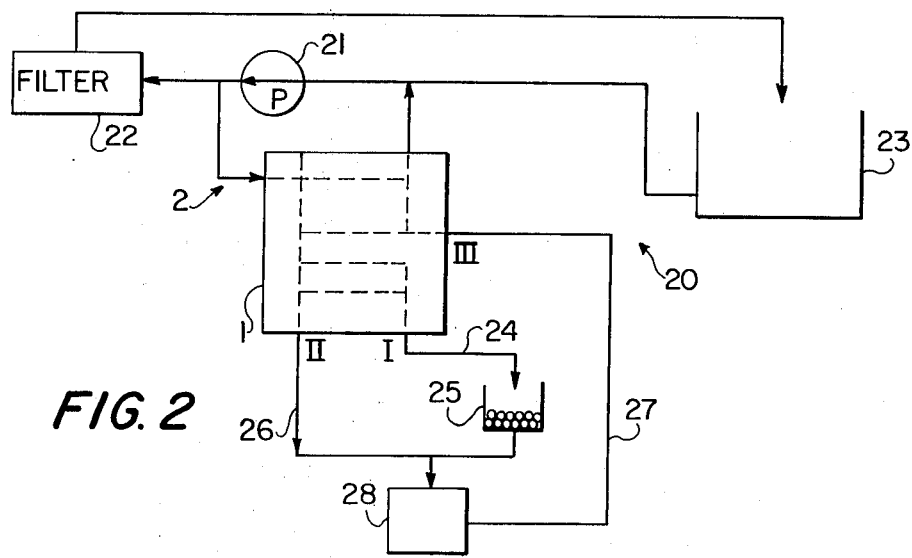
FIG. 2 is a schematic illustration of a system utilizing the preferred embodiment regulator.

The operation of regulator 1 will now be further exemplified with reference to the fluid handling system 20 shown in FIG. 2. As schematically represented, the fluid handling system 20 may comprise a main fluid circuit having a circulating pump 21, and a receiver 23 such as a swimming pool or holding tank. The regulator 1 is located in parallel circuit 2 connected across the pump 21. The auxilliary ports I and II are connected to auxilliary circuits 24 and 26 respectively, the former circuit being connected to vessel 25 which can be used, for example, to form a concentrated electrolyte while the latter circuit, through appropriate flow controls (not shown) can be used to dilute the concentrated electrolyte to the appropriate concentration prior to subsequent treatment in treatment means 28, which could be an electrolytic cell. It will be clear to those of ordinary skill in the art that the type of solution to be formed will depend on the fluid to be treated and the type of treatment to be achieved and, thus, a wide range of applications will be apparent; e.g., for water treatment, a brine could be formed in vessel 25 and used to generate chlorine or sodium hypochlorite in an electrolytic cell treatment means 28. The treated fluid then would be returned to the main flow by another fluid circuit 27 through auxilliary port III.

Thus, it can be seen that the invention constitutes a simple and inexpensive means to regulate, subdivide, and/or recombine a fluid in a pumped circuit.

I claim:

1. A flow regulator comprised of a body member, said body member having:

a. a fluid intake port having a flow regulating valve;

b. a fluid exhaust port having a flow regulating valve;

c. a first set of parallel passages interconnected to each other at both ends and in communication with said intake and exhaust ports;
d. a second set of parallel passages interconnected to each other at both ends, said first set of passages being interconnected with said second set of passages solely at the end of said sets closest to said intake port;
e. orifice means located in each of the interconnections between said passages of said sets of passages at the end of the passages closest to said intake port, and in the interconnection between said sets of passages;
f. a first auxilliary port communicating directly with the end of the passages of said second set of parallel passages located closest to said intake port, and having means to restrict the flow therethrough;
g. a second auxilliary port in direct communication with the other end of the passages of said second set;
h. a third auxilliary port in direct communication with the end of the passages of said first set located closest to said exhaust port; and
i. valve means in each of said passages of said first and second sets of parallel passages.

2. The flow regulator of claim 1 wherein said intake port is parallel with said first set of parallel passages and said exhaust port is perpendicular thereto.

3. The flow regulator of claim 1 wherein said first and second auxilliary ports are parallel to said exhaust port and said third auxilliary port is parallel to said intake port.

4. In a fluid handling system of the type having a pump for circulating fluid about a main fluid circuit and means for treating said fluid as it travels about said circuit, the improvement comprising:
a. the flow regulator of claim 1 connected in parallel across said pump, the intake port being connected to the high pressure side of said pump and the exhaust port being connected to the low pressure side of said pump;
b. first auxilliary fluid circuit means connected between said first and second auxilliary ports and at least one fluid treating means; and
c. second auxilliary fluid circuit means connected between said at least one fluid treating means and said third auxilliary port, whereby a portion of the fluid in said main circuit will be removed by said regulator and transferred through said first auxilliary circuit means to said at least one treating means, and treated fluid will be returned by said second auxilliary circuit through said regulator to said main circuit.

* * * * *